United States Patent
Mahajan et al.

(10) Patent No.: US 10,185,474 B2
(45) Date of Patent: Jan. 22, 2019

(54) GENERATING CONTENT THAT INCLUDES SCREEN INFORMATION AND AN INDICATION OF A USER INTERACTION

(71) Applicant: Verizon Patent and Licensing Inc., Arlington, VA (US)

(72) Inventors: Amit Mahajan, Bridgewater, NJ (US); Vijayanand K. Paulrajan, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 227 days.

(21) Appl. No.: 15/056,016

(22) Filed: Feb. 29, 2016

(65) Prior Publication Data

US 2017/0249068 A1 Aug. 31, 2017

(51) Int. Cl.
| | | |
|---|---|---|
| G06F 3/16 | (2006.01) | |
| H04L 29/08 | (2006.01) | |
| G06F 3/0484 | (2013.01) | |
| G06F 3/0488 | (2013.01) | |

(52) U.S. Cl.
CPC .......... *G06F 3/0484* (2013.01); *G06F 3/0488* (2013.01); *G06F 3/167* (2013.01); *H04L 67/10* (2013.01)

(58) Field of Classification Search
CPC ...... G06F 3/0484; G06F 3/0488; G06F 3/167; G06F 9/4446; H04L 67/10
See application file for complete search history.

(56) References Cited

U.S. PATENT DOCUMENTS

| | | | | |
|---|---|---|---|---|
| 5,537,529 A | * | 7/1996 | Borovoy | G06F 9/4446 345/501 |
| 7,360,159 B2 | * | 4/2008 | Chailleux | G06F 3/0481 715/704 |
| 7,752,575 B2 | * | 7/2010 | Anglin | G06F 17/30899 715/765 |
| 8,549,401 B1 | * | 10/2013 | Hernacki | G06Q 10/10 715/705 |
| 2005/0071760 A1 | * | 3/2005 | Jaeger | G06F 9/4446 715/705 |
| 2007/0015118 A1 | * | 1/2007 | Nickell | G09B 5/02 434/118 |
| 2007/0300179 A1 | * | 12/2007 | Friedlander | G06F 9/45512 715/781 |
| 2008/0189612 A1 | * | 8/2008 | Zhang | G06F 9/4446 715/709 |
| 2009/0132918 A1 | * | 5/2009 | Deyo | G06F 9/4446 715/705 |

(Continued)

OTHER PUBLICATIONS

Microsoft Computer Dictionary, Fifth Edition (© 2002 Microsoft Corporation, selected pages) (Year: 2002).*

*Primary Examiner* — Amy M Levy

(57) ABSTRACT

A device may activate a screen capture mode and may record screen information provided via a touch screen display associated with the device based on activating the screen capture mode. The device may detect one or more user interactions with the touch screen display in association with the screen information. The one or more user interactions may include a touch gesture. The device may deactivate the screen capture mode and may generate content including the screen information and an indication of the one or more user interactions. The indication may be overlaid on the screen information.

20 Claims, 10 Drawing Sheets

(56) References Cited

U.S. PATENT DOCUMENTS

| | | | |
|---|---|---|---|
| 2010/0031144 A1* | 2/2010 | Farrington | G06F 3/0481 715/712 |
| 2010/0049800 A1* | 2/2010 | Hatfield | G06F 9/453 709/204 |
| 2012/0102384 A1* | 4/2012 | Dao | G06F 9/4446 715/205 |
| 2012/0144286 A1* | 6/2012 | Bank | G06F 17/241 715/230 |
| 2013/0083210 A1* | 4/2013 | Beckham | H04N 21/2743 348/207.11 |
| 2013/0107144 A1* | 5/2013 | Marhefka | G06F 1/3275 349/12 |
| 2013/0218315 A1* | 8/2013 | Jaeger | G06F 3/16 700/94 |
| 2014/0047334 A1* | 2/2014 | Nouard | G06F 9/4446 715/705 |
| 2014/0149496 A1* | 5/2014 | Lee | G09B 5/00 709/203 |
| 2014/0178035 A1* | 6/2014 | Ballagas | G11B 27/031 386/230 |
| 2014/0180999 A1* | 6/2014 | Chun | G06F 9/4446 706/55 |
| 2014/0344683 A1* | 11/2014 | Urunga | G06F 9/4446 715/705 |
| 2015/0046857 A1* | 2/2015 | Kihara | G06F 9/4446 715/765 |
| 2015/0058734 A1* | 2/2015 | Ward | G06F 9/4443 715/731 |
| 2015/0206063 A1* | 7/2015 | Santero | G06N 5/00 706/12 |
| 2015/0346937 A1* | 12/2015 | Mahmoudian-Bidgoly | G06F 3/0484 715/753 |
| 2016/0055246 A1* | 2/2016 | Marcin | G06F 17/30867 707/732 |
| 2016/0071179 A1* | 3/2016 | Babcock | G06Q 30/0623 705/26.61 |
| 2016/0225369 A1* | 8/2016 | Agrawal | G10L 15/22 |
| 2016/0349978 A1* | 12/2016 | Gonsalves | G06F 3/04847 |
| 2017/0010903 A1* | 1/2017 | Kidron | G06F 3/0482 |
| 2017/0177386 A1* | 6/2017 | Fung | G06F 9/4446 |

* cited by examiner

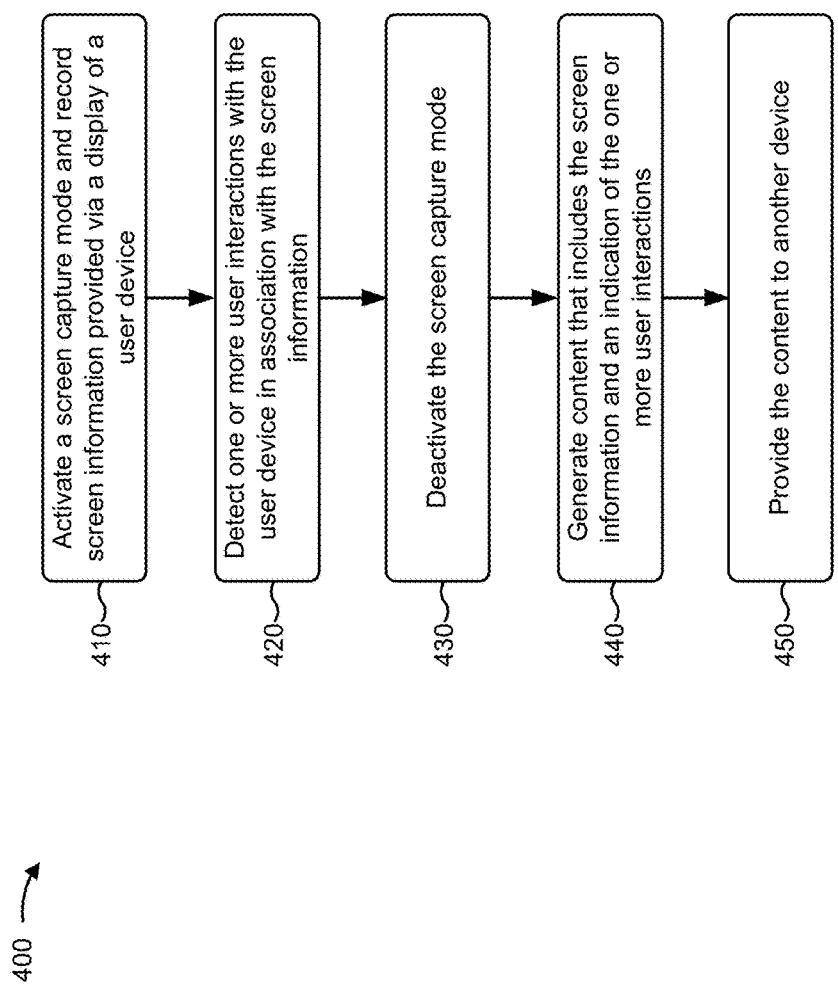

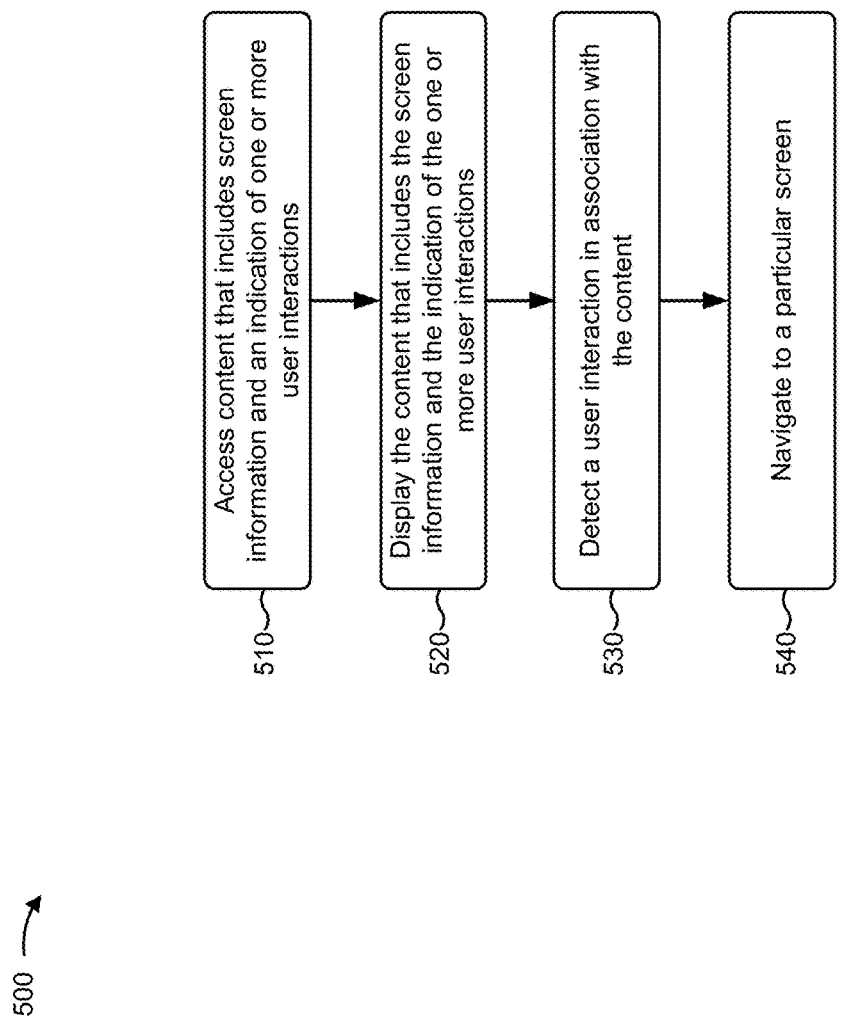

US 10,185,474 B2

GENERATING CONTENT THAT INCLUDES SCREEN INFORMATION AND AN INDICATION OF A USER INTERACTION

BACKGROUND

A screenshot, or screen capture, may include an image taken by a user to record visible items displayed via an output device, such as a display screen, associated with a user device. A screenshot may be saved as a graphics file and may be shared with other users to demonstrate a program, share information associated with the user device, or the like.

BRIEF DESCRIPTION OF THE DRAWINGS

FIG. 4 is a flow chart of an example process for generating content that includes screen information and an indication of a user interaction; and FIG. 5 is a flow chart for displaying content that includes screen information and an indication of a user interaction.

DETAILED DESCRIPTION OF PREFERRED EMBODIMENTS

The following detailed description of example implementations refers to the accompanying drawings. The same reference numbers in different drawings may identify the same or similar elements.

A user device, such as a smart phone, may include various features, settings, applications, or the like. Further, a user, when using a particular application, configuring a particular setting, or the like, may complete a particular sequence of steps by interacting with the user device. The user may want to instruct another user regarding how to complete the particular sequence of steps. For example, the sequence of steps may not be intuitive and/or the other user may not possess a similar understanding of the user device. Implementations described herein may assist a user in capturing screen information associated with the user device and generating content that includes the screen information and indications of user interactions with the user device. In this way, the user may provide the content to another user, which may instruct the other user regarding how to use a user device. Implementations described herein may allow a user to efficiently use a user device by reducing a quantity of operating errors associated with using the user device, thereby conserving processor and/or memory resources.

Figure 1A:
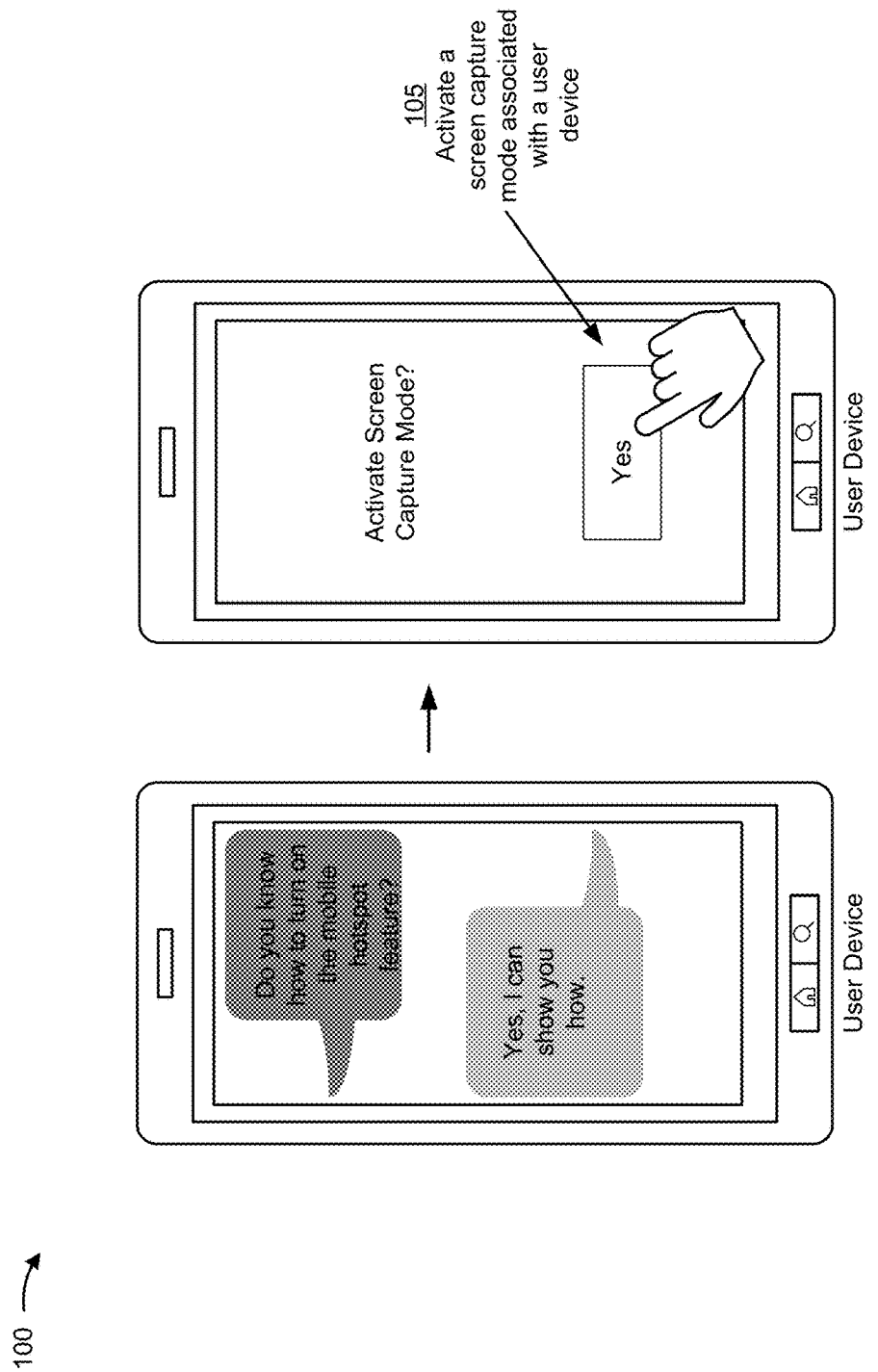
FIGS. 1A-1F are diagrams of an overview of an example implementation described herein.

FIGS. 1A-1F are diagrams of an overview of an example implementation 100 described herein. As shown in FIG. 1A, and by reference number 105, a user device may activate a screen capture mode. For example, assume that a user of the user device wants to instruct a user of a playback device regarding how to configure a particular setting on the playback device (e.g., turn on a mobile hotspot feature). As shown, the user device may activate the screen capture mode based on a user input.

Figure 1B:
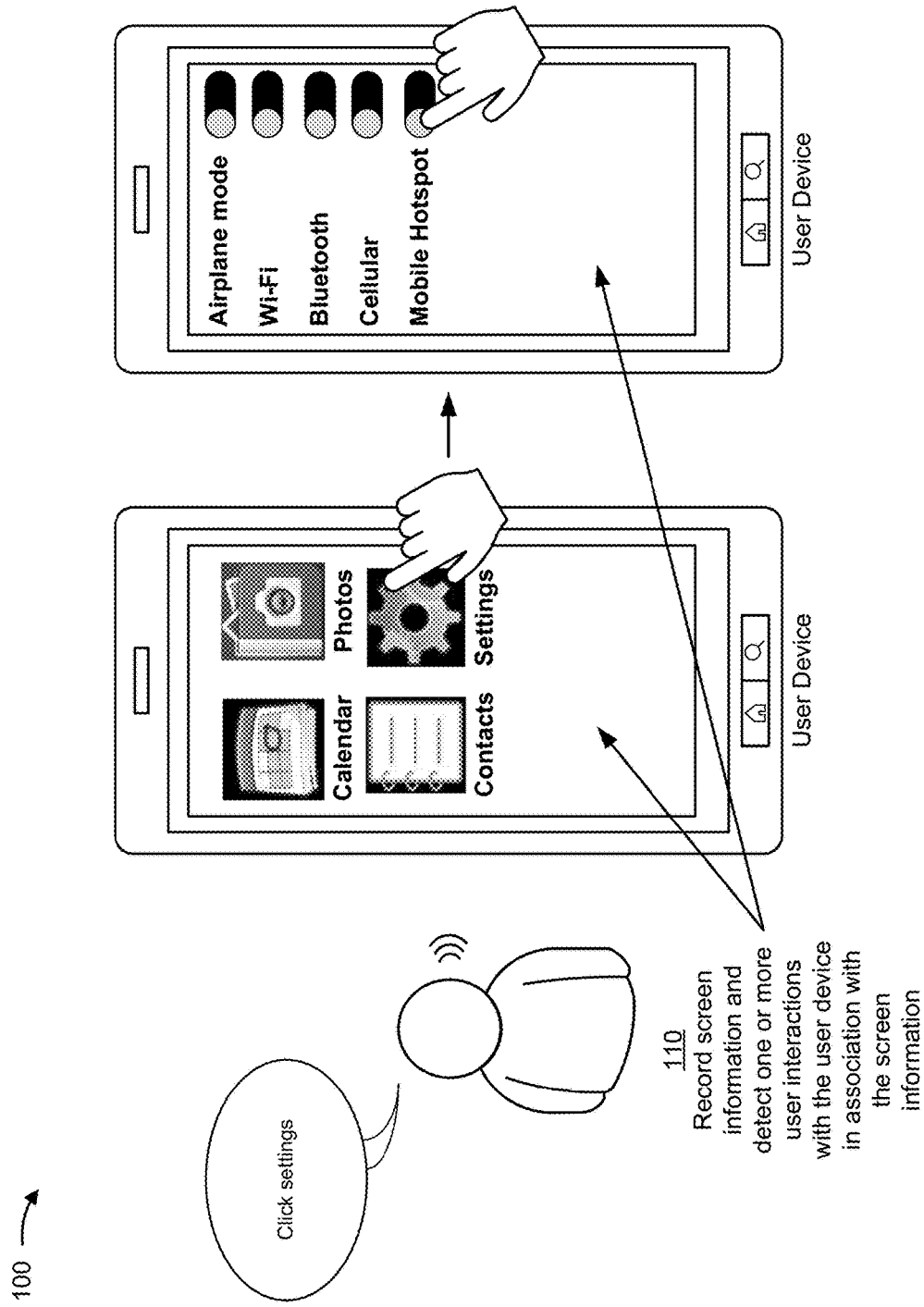

As shown in FIG. 1B, and by reference number 110, the user device may record screen information and detect one or more user interactions with the user device in association with the screen information. For example, the user device may record screen information that is displayed via a display associated with the user device. As shown, the user device may record screen information associated with a home screen and a settings screen (e.g., based on the user navigating the particular sequence of screens). The user device may detect a physical user interaction with the user device in association with the home screen (e.g., based on a touch gesture associated with the settings icon). Additionally, the user device may detect an audible user interaction with the user device in association with the home screen (e.g., based on the user saying "click settings"). As shown, the user device may detect another physical user interaction with the user device in association with the settings screen (e.g., based on a touch gesture associated with a mobile hotspot icon).

Figure 1C:
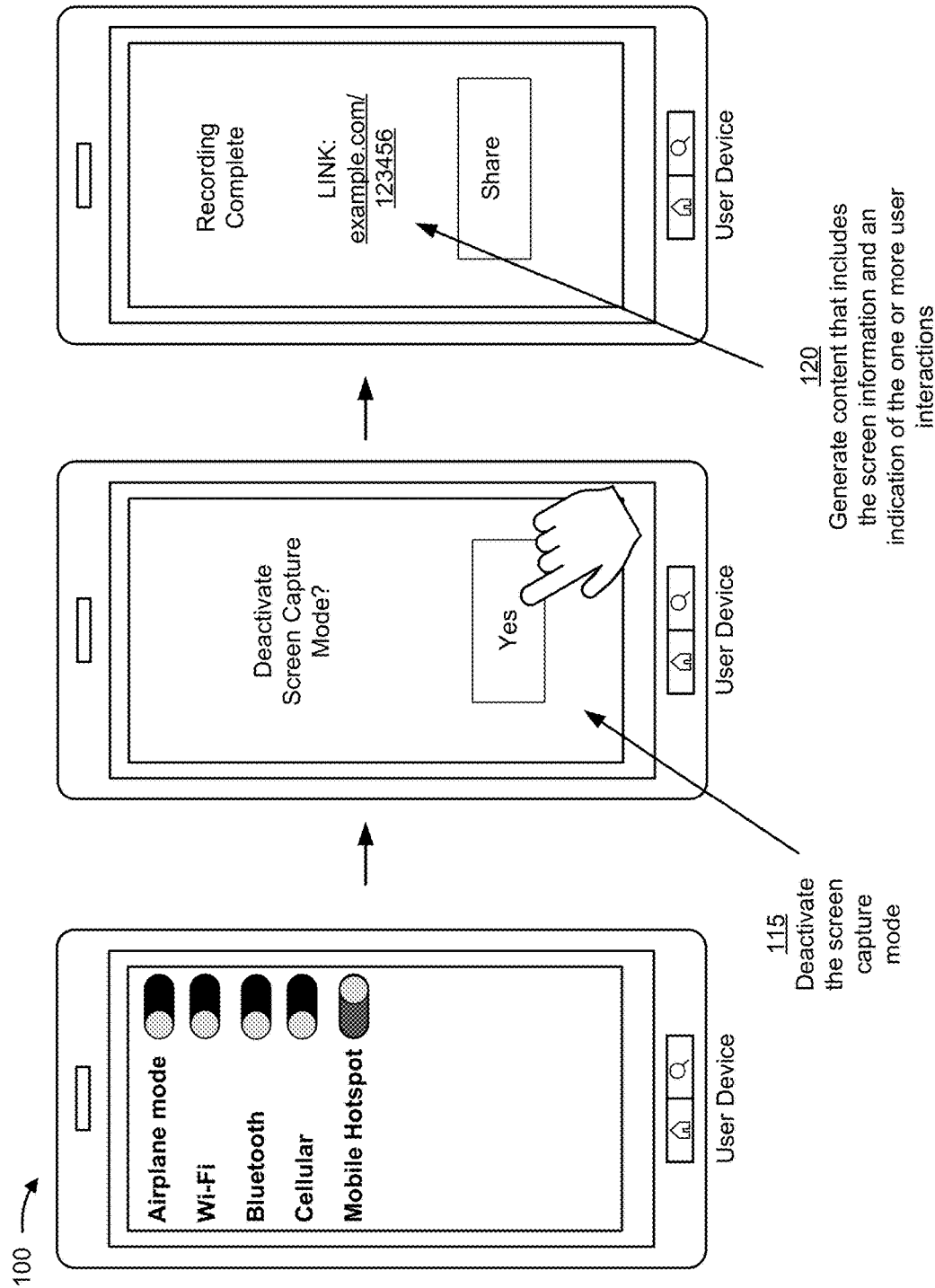

As shown in FIG. 1C, and by reference number 115, the user device may deactivate the screen capture mode. For example, as shown, the user device may deactivate the screen capture mode based on a user input (e.g., after the user has performed a particular sequence of steps). As shown by reference number 120, the user device may generate content that includes the screen information and an indication of the one or more user interactions. As shown, the user device may generate a uniform resource identifier (URI), associated with the content, which may allow other devices to access the content.

Figure 1D:
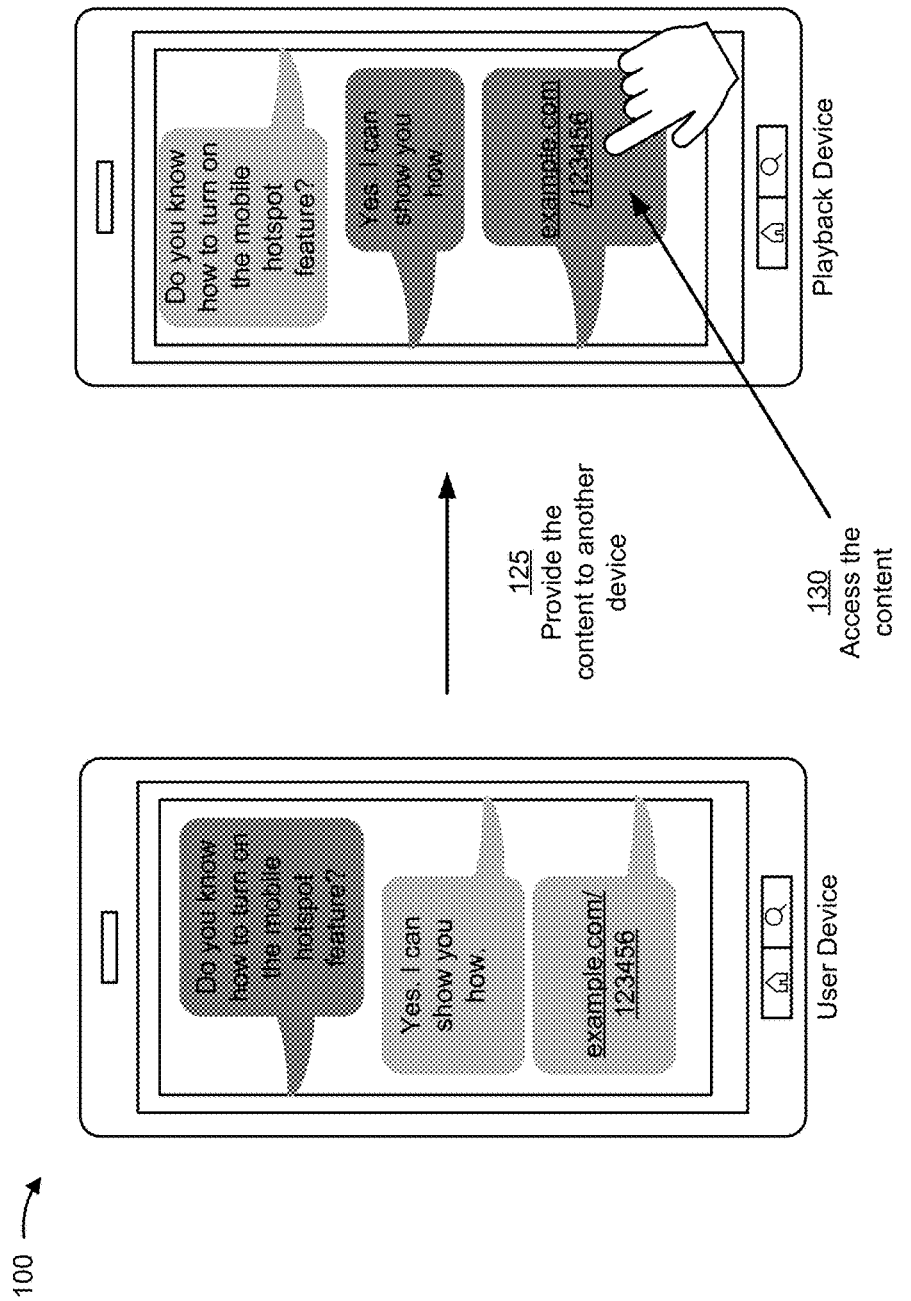

As shown in FIG. 1D, and by reference number 125, the user device may provide the content to another device. For example, as shown, the user device may provide the content to the playback device. As shown by reference number 130, the playback device may access the content. For example, a user of the playback device may interact with the URI to cause the playback device to access the content.

Figure 1E:
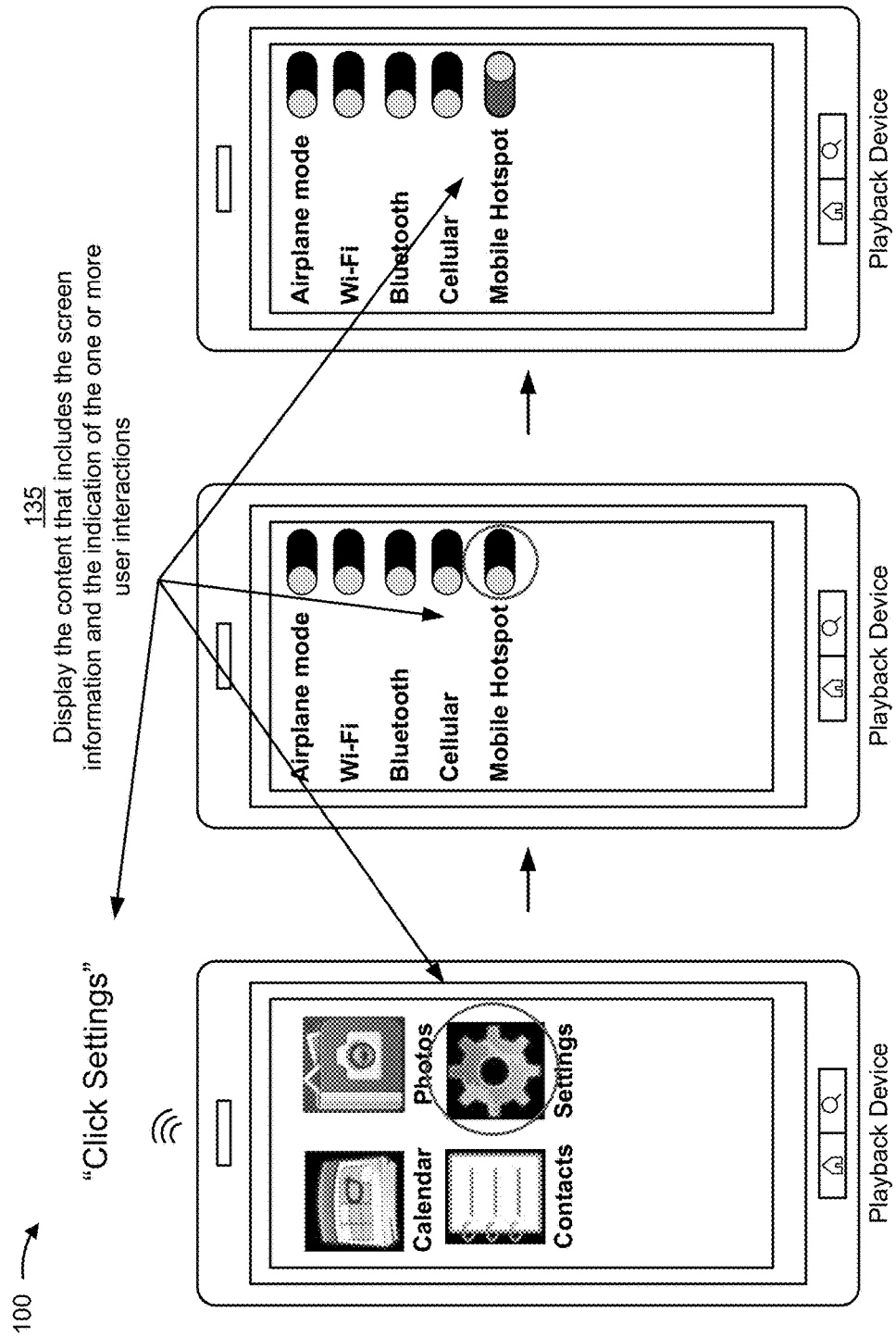

As shown in FIG. 1E, and by reference number 135, the playback device may display the content that includes the screen information and the indication of the one or more user interactions. For example, as shown, the playback device may display the screen information associated with the home screen of the user device. Additionally, the playback device may display an interaction indicator, shown as a circle, around the settings icon. For example, the interaction indicator may represent the user interaction, by the user of the user device, with the settings screen associated with the user device. Additionally, as shown, the playback device may provide audio (e.g., "click settings") that corresponds to the audible user interaction with the settings screens associated with the user device. Additionally, as shown, the playback device may display the screen information associated with the settings screen of the user device. Further, the playback device may display an interaction indicator, shown as a circle, around the mobile hotspot icon.

Figure 1F:
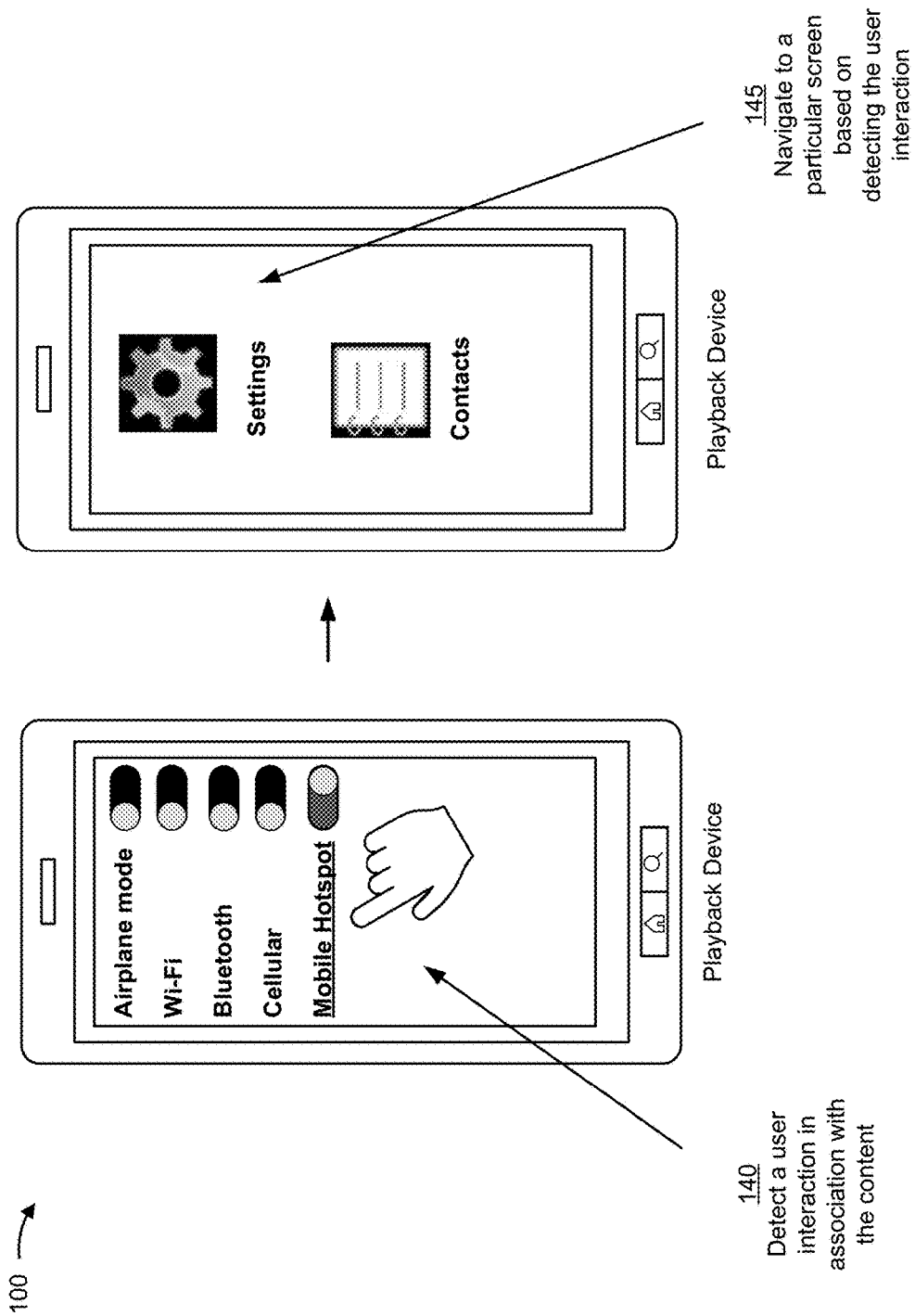

As shown in FIG. 1F, and by reference number 140, the playback device may detect a user interaction in association with the content. In some implementations, the content may include one or more links or shortcuts that may be embedded in the content. As shown, the user of the playback device may interact with the link "mobile hotspot." As shown by reference number 145, the playback device may navigate to a particular screen associated with the playback device based on detecting the user interaction. As shown, the playback device may navigate to a home screen associated with the playback device, which may allow the user of the playback device to complete the sequence of steps as indicated by the content. In this way, a user device may generate content including screen information and an indication of one or more user interactions, which may allow the user to instruct another user on how to configure a particular setting (e.g., turn on the mobile hotspot feature).

Implementations described herein may assist a user in generating content that includes screen information, displayed on a user device, and an indication of one or more user interactions with the screen information. Additionally, implementations described herein may assist a user device in providing the content to another user device, which may allow another user to efficiently use a user device by reducing a quantity of operating errors associated with using the user device, thereby conserving processor, memory, and battery resources.

As indicated above, FIGS. 1A-1F are provided merely as an example. Other examples are possible and may differ from what was described with regard to FIGS. 1A-1F.

Figure 2:
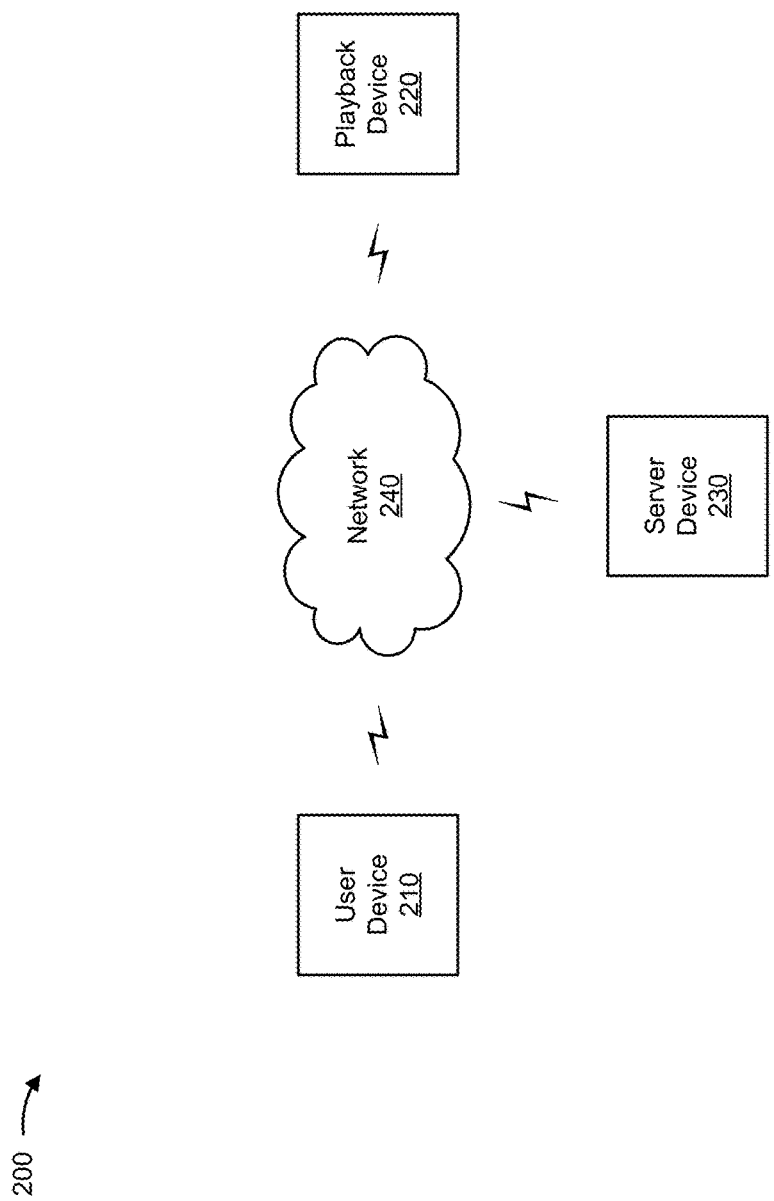
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a playback device 220, a server device 230, and a network 240. Devices of environment 200 may interconnect via wired connections, wireless connections, or a combination of wired and wireless connections.

User device 210 and/or playback device 220 include one or more devices capable of receiving, generating, storing, processing, and/or providing information associated with content that includes screen information and an indication of a user interaction. For example, user device 210 and/or playback device 220 may include a communication and/or computing device, such as a mobile phone (e.g., a smart phone or a radiotelephone), a desktop computer, a laptop computer, a tablet computer, a handheld computer, a gaming device, a wearable communication device (e.g., a smart wristwatch or a pair of smart eyeglasses), or a similar type of device. In some implementations, user device 210 may generate content that includes screen information and an indication of a user interaction, and may provide the content to playback device 220. Additionally, playback device 220 may display and/or play the content that includes the screen information and the indication of the user interaction.

Server device 230 includes one or more devices capable of receiving, generating, storing, processing, and/or providing information associated with content that includes screen information and an indication of a user interaction. For example, server device 230 may include a computing device, such as a server device or a similar type of device. In some implementations, server device 230 may store content and may provide content to user device 210 and/or playback device 220. For example, user device 210 and/or playback device 220 may access the content from server device 230 using a URI.

Network 240 may include one or more wired and/or wireless networks. For example, network 240 may include a cellular network (e.g., a long-term evolution (LTE) network, a third generation (3G) network, or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
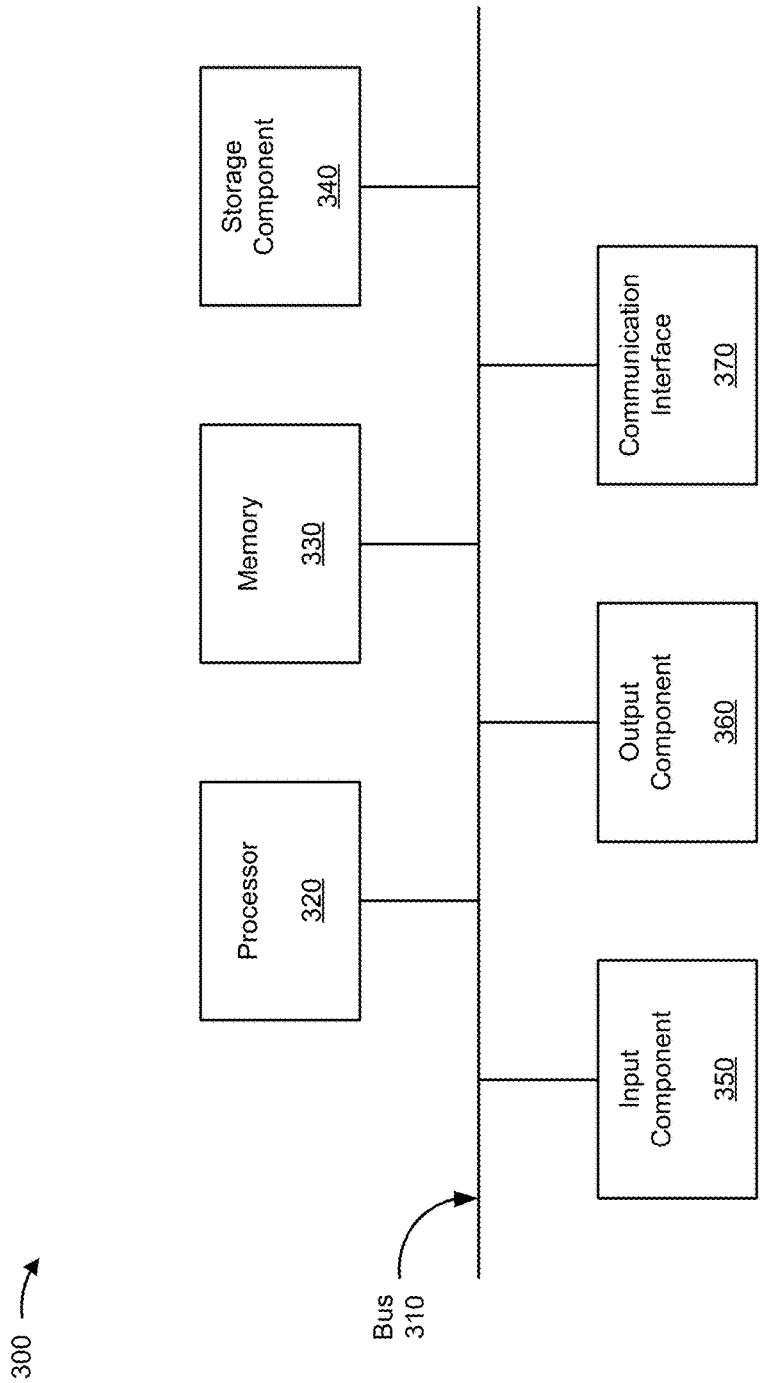
FIG. 3 is a diagram of example components of one or more devices of FIG. 2.

FIG. 3 is a diagram of example components of a device 300. Device 300 may correspond to user device 210, playback device 220, and/or server device 230. In some implementations, user device 210, playback device 220, and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for generating content that includes screen information and an indication of a user interaction. In some implementations, one or more process blocks of FIG. 4 may be performed by user device 210. In some implementations, one or more process blocks of FIG. 4 may be performed by another device or a group of devices separate from or including user device 210, such as playback device 220 and/or server device 230.

As shown in FIG. 4, process 400 may include activating a screen capture mode and recording screen information provided via a display of a user device (block 410). For example, user device 210 may activate a screen capture mode based on user input (e.g., from a user of user device 210) indicating that user device 210 should activate the screen capture mode. Additionally, or alternatively, user device 210 may activate the screen capture mode based on a user navigating to a particular screen associated with user device 210 (e.g., a home screen or a main settings screen).

In some implementations, user device 210 may record screen information based on activating the screen capture mode. For example, user device 210 may record screen information that is displayed via an output component (e.g., a display) associated with user device 210. In some implementations, user device 210 may record screen information associated with a particular screen (e.g., a home screen, a settings screen, and/or an application screen), a particular sequence of screens, or the like. For example, a user of user device 210 may navigate multiple screens associated with user device 210, and user device 210 may record screen information associated with each particular screen (e.g., as an image, as a series of images, or as a video).

As further shown in FIG. 4, process 400 may include detecting one or more user interactions with the user device in association with the screen information (block 420). For example, user device 210 may detect and record one or more user interactions with user device 210. In some implementations, user device 210 may detect a physical user interaction with user device 210. For example, user device 210 may detect a touch gesture (e.g., a tap, a double-tap, a tap and hold, a nudge, a pinch, a spread, a slide, a drag, a flick, or a swipe) associated with one or more portions of a display (e.g., a touch display) of user device 210. Additionally, or alternatively, user device 210 may detect a motion of user device 210 caused by a user (e.g., a shaking motion or a rotating motion). In some implementations, user device 210 may determine and record a position of the physical user interaction relative to screen information, a duration of the physical user interaction, a direction of movement associated with the physical user interaction, a time associated with the user interaction relative to recorded data associated with the screen information, or the like. Additionally, or alternatively, user device 210 may detect and record an audible user interaction, such as a voice of the user, or the like, in association with the screen information.

In some implementations, user device 210 may detect one or more user interactions in association with a particular screen. Additionally, or alternatively, user device 210 may detect one or more user interactions in association with multiple screens (e.g., as a user navigates multiple screens). In this way, user device 210 may store information associated with the one or more user interactions, positions of the one or more user interactions relative to the screen information, or the like, which may allow user device 210 to generate content that includes the screen information and an indication of a user interaction, as described elsewhere herein.

As further shown in FIG. 4, process 400 may include deactivating the screen capture mode (block 430). For example, user device 210 may deactivate the screen capture mode based on user input. Additionally, or alternatively, user device 210 may deactivate the screen capture mode based on a user navigating to a particular screen (e.g., a home screen) or a particular action being performed. In some implementations, user device 210 may stop recording the screen information and/or indications of user interactions based on deactivating the screen capture mode. In this way, user device 210 may generate content that includes the screen information and an indication of one or more user interactions, as described below.

As further shown in FIG. 4, process 400 may include generating content that includes the screen information and an indication of the one or more user interactions (block 440). For example, user device 210 may generate content, such as an image, a series of images, an animation, or a video, that includes the screen information and an indication of the one or more user interactions. In some implementations, the content may include the screen information and one or more indications of the one or more user interactions (e.g., physical or audible user interactions associated with the screen information). Thus, the content may include both a visual component (e.g., screen information) and a user interaction component (e.g., indication(s) of one or more user interactions) that are recorded by user device 210.

User device 210 and/or server device 230 may encode the visual component and the user interaction component to generate the content. For example, a user interaction may be associated with a particular time associated with recorded screen information (e.g., using a time code), a particular position relative to recorded screen information (e.g., using a position code), or the like. Additionally, or alternatively, the user interaction may be a particular type of interaction (e.g., a tap, a swipe, a pinch, etc.), which may be recorded and/or encoded to include an indication of the type of interaction in the generated content (e.g., using an interaction type code).

In some implementations, the indication of the one or more user interactions may be represented in the content using an interaction indicator, such as an icon, an image, an animation, or the like. For example, user device 210 may provide (e.g., superimpose or overlay) an interaction indicator in association with the screen information, which may correspond to a user interaction. For example, the interaction indicator may represent a user interaction (e.g., a touch gesture), and may be displayed in a position, within the screen information, at which the user interaction occurred. Additionally, or alternatively, the interaction indicator may be displayed for a duration that corresponds to a duration of the user interaction, may be associated with an animation that indicates a direction that corresponds to the user interaction, or the like. Additionally, or alternatively, the interaction indicator may indicate an effect on the screen information caused by the user interaction (e.g., a change of a setting).

In some implementations, different types of user interactions (e.g., different types of touch gestures) may be associated with different interaction indicators. For example, a tap may be associated with a particular type of interaction indicator, whereas a pinch may be associated with another type of interaction indicator. In this way, a user of playback device 220 may differentiate particular user interactions based on the type of interaction indicator. In some implementations, user device 210 may provide (e.g., superimpose or overlay) text, in association with the screen information, that indicates a type of user interaction associated with the interaction indicator (e.g., may provide an interaction indicator associated with a tap and may provide text indicating "tap"). Additionally, or alternatively, user device 210 may provide information that highlights, to a user, where the user interaction occurred or where an interaction should occur in relation to the screen information.

In some implementations, the content may include screen information associated with multiple screens (e.g., a sequence of screens). Additionally, the screen information associated with each particular screen may include one or more interaction indicators representing one or more user interactions with the particular screen. In this way, the content, when displayed and/or played (e.g., via playback device 220), may allow another user to identify a user's interaction(s) with a particular screen and/or a sequence of screens.

In some implementations, user device 210 may allow a user to configure the content. For example, user device 210 may allow a user to configure the content to include the screen information, an indication of a physical user interaction, and/or an indication of an audible user interaction. Additionally, or alternatively, user device 210 may allow a user to configure the content to include one or more pauses. For example, if the content includes screen information associated with multiple screens, then the content, when displayed and/or played, may include a pause before transitioning from a screen to another screen. Additionally, or alternatively, if the content includes screen information associated with a particular screen and multiple user interactions associated with the particular screen, then the content, when displayed and/or played, may include a pause between displaying consecutive indications of a user interaction. Additionally, or alternatively, user device 210 may allow a user to configure the content to permit a user of playback device 220 to control playback of the content (e.g., adjust a playback rate, pause, or the like).

In some implementations, user device 210 may generate the content to include one or more links and/or shortcuts. For example, user device 210 may embed one or more links and/or shortcuts within the content. In some implementations, a link and/or shortcut may be interpreted by playback device 220 as a path to a particular screen. Additionally, when accessed, the link and/or shortcut may cause playback device 220 to navigate to a particular screen (e.g., a home screen, a settings screen, or a screen associated with an application). In this way, a user, when viewing the content, may access a link and/or shortcut to navigate playback device 220 to a particular screen, as described elsewhere herein.

In some implementations, user device 210 may associate device information with the content. The device information may include, for example, a device type (e.g., a device model), a device version, an operating system type (e.g., Android or iOS), an operating system version, a user interface type, a user interface version, a screen parameter (e.g., screen dimensions, a screen size, etc.), an application type associated with an application being recorded, an application version associated with an application being recorded, or the like. The device information may be determined based on user device 210 that records the screen information and one or more user interactions. In this way, server device 230 and/or playback device 220 may determine whether content, to be potentially provided and/or played by playback device 220, is relevant to corresponding device information for playback device 220.

As further shown in FIG. 4, process 400 may include providing the content to another device (block 450). For example, user device 210 may provide the content to playback device 220 and/or server device 230. In some implementations, user device 210 may provide the content to server device 230, and server device 230 may store the content. For example, server device 230 may provide a URI to user device 210 and/or playback device 220, which may allow user device 210 and/or playback device 220 to access the content, upload the content (e.g., to a content sharing website), provide the URI to another device, or the like.

In some implementations, server device 230 may generate one or more links and/or shortcuts in association with the content and provide the content that includes the one or more links and/or shortcuts. For example, server device 230 may embed one or more links and/or shortcuts within the content that, when accessed, cause playback device 220 to navigate to a particular screen associated with playback device 220. For example, server device 230 may identify a device identifier (e.g., a mobile device number (MDN)) associated with user device 210, and may determine device information associated with user device 210 based on the device identifier and/or the content. Additionally, server device 230 may identify one or more screens associated with user device 210, a hierarchy of screens associated with user device 210, or the like.

In some implementations, server device 230 may store device information associated with user device 210, and may associated with device information with generated content. Additionally, or alternatively, server device 230 may identify and/or store device information associated with playback device 220. In this way, server device 230 may prevent content recorded on a user device 210 associated with first device information (e.g., an Android operating system) from being provided to playback device 220 associated with second device information (e.g., an iOS operating system). Furthermore, server device 230 may provide content to playback device 220 that is applicable to playback device 220. Additionally, or alternatively, server device 230 may map or index links and/or shortcuts included in the content with particular screens associated with user device 210. Additionally, or alternatively, server device 230 may map one or more screens associated with user device 210 with one or more screens associated with playback device 220, as described elsewhere herein.

In some implementations, user device 210 may provide the content to playback device 220. For example, user device 210 may provide the content via a message (e.g., a short message service (SMS) message, a multimedia messaging service (MMS) message, and/or an email message) and/or may provide a URI associated with the content to playback device 220. In this way, playback device 220 may access the content, as described in more detail in association with FIG. 5. Implementations described herein may assist a user device in generating content that includes screen information and an indication of one or more user interactions. In this way, a user may instruct another user on how to use a user device, thereby reducing operating errors and/or conserving processor and memory resources.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for displaying content that includes screen information and an indication of a user interaction. In some implementations, one or more process blocks of FIG. 5 may be performed by playback device 220. In some implementations, one or more process blocks of FIG. 5 may be performed by another device or a group of devices separate from or including playback device 220, such as user device 210 and/or server device 230.

As shown in FIG. 5, process 500 may include accessing content that includes screen information and an indication of one or more user interactions (block 510). For example, playback device 220 may access content, such as an image, a series of images, an animation, or a video, that includes screen information and an indication of one or more user interactions. In some implementations, playback device 220 may receive the content from user device 210 (e.g., in a message). Additionally, or alternatively, playback device 220 may receive a URI associated with the content and may access the content using the URI.

In some implementations, playback device 220 may request the content from server device 230 (e.g., using a URI). In some implementations, server device 230 may receive the request and identify a device identifier associated with playback device 220 (e.g., an MDN) and/or may identify device information associated with playback device 220. In some implementations, server device 230 may identify information that maps one or more screens associated with playback device 220 with one or more screens associated with user device 210 (e.g., user device 210 that generated the content).

Additionally, or alternatively, server device 230 may embed one or more links and/or shortcuts within the content that, when accessed, cause playback device 220 to navigate to a particular screen. In this way, server device 230 may provide, to playback device 220, the content that includes one or more links and/or shortcuts that when accessed may allow playback device 220 to navigate to a particular screen associated with playback device 220. For example, a link, associated with screen information corresponding to a particular screen of user device 210, when accessed may cause playback device 220 to navigate to a corresponding screen (e.g., based on a mapping between screens) or a particular screen (e.g., a first screen in a sequence of screens).

In some implementations, server device 230 may identify a device identifier associated with playback device 220 based on playback device 220 accessing a URI associated with the content. Additionally, server device 230 may store information and/or provide information to another device (e.g., associated with a network operator) that indicates that playback device 220 accessed the URI associated with the content. In this way, a network operator may determine that playback device 220 accessed the URI, may cause a user of playback device 220 to be billed for accessing the URI, may credit an account associated with a user of user device 210 that generated the content, or the like.

In some implementations, playback device 220 may receive first device information, associated with user device 210 (e.g., the user device 210 that generated the content), and may compare the first device information and second device information associated with playback device 220. Playback device 220 may determine whether the content is applicable to playback device 220 based on comparing the first device information and the second device information. For example, the content may be associated with the same or a different operating system, application version, or the like. If the comparison indicates that the content is not applicable (e.g., if the device information does not match or is incompatible), playback device 220 may display a prompt indicating that the content is not applicable to playback device 220.

Additionally, or alternatively, playback device 220 may request and/or receive other content that is applicable to playback device 220. For example, playback device 220 may provide the second device information to server device 230. Server device 230 may use the second device information to identify content (e.g., one or more videos, or the like) associated with the second device information, and may provide the identified content to playback device 220.

As further shown in FIG. 5, process 500 may include displaying the content that includes the screen information and the indication of the one or more user interactions (block 520). For example, playback device 220 may display and/or play the content, such as the image, the series of images, the animation, or the video, that includes the screen information and the indication of the one or more user interactions.

In some implementations, a user of playback device 220 may configure playback of the content, and playback device 220 may provide the content to include the screen information, an indication of a physical user interaction associated the screen information, an indication of an audible user interaction associated with the screen information, or a combination thereof based on the user configuration. For example, playback device 220 may display the screen information and one or more interaction indicators in association with the screen information. Additionally, or alternatively, playback device 220 may provide an indication of an audible user interaction (e.g., audio associated with the content) and may not display the screen information and/or one or more interaction indicators. In this way, a user of playback device 220 may interact with a screen or screens associated with playback device 220 while playback device 220 provides the indication of the audible user interaction.

Additionally, or alternatively, playback device 220 may provide, for display, one or more interaction indicators associated with the screen information and may not provide the screen information. For example, playback device 220 may provide (e.g., superimpose or overlay) one or more interaction indicators in association with a screen or screens associated with playback device 220. In this way, a user of playback device 220 may view the one or more interaction indicators and may interact with a screen or screens associated with playback device 220 (e.g., to complete a sequence of steps to configure a particular setting or use a particular application).

Additionally, or alternatively, playback device 220 may overlay the content (e.g., the screen information and one or more interaction indicators) over a native screen associated with playback device 220. For example, playback device 220 may for display the content at a particular opacity level (e.g., 25% or 50%), so that the user can see the native screen with the screen information and/or the interaction indicator(s) overlaid on the native screen.

In some implementations, the content may include a pause that occurs until a user interacts with playback device 220. For example, playback device 220 may pause playback of the content before transitioning from first screen information (e.g., associated with a first screen) to second screen information (e.g., associated with a second screen). Additionally, or alternatively, playback device 220 may pause playback of the content before displaying an interaction indicator or a different interaction indicator than one that is currently displayed. In some implementations, the pause may occur until playback device 220 detects a user interaction with playback device 220 (e.g., a touch gesture). In some implementations, the pause may occur until playback device 220 detects the user interaction at a position of the screen that corresponds to a position of an interaction indicator. In this way, playback device 220 may assist the user with carrying out the interactions identified in the content.

In some implementations, the content may include an instruction (e.g., executable code) that causes playback device 220 to identify one or more relevant screens and/or icons that are particular to playback device 220, and display one or more interaction indicators in association with the relevant screens and/or icons. For example, if a user is to start on a home screen and navigate to another screen that includes a particular icon (e.g., to configure a setting), then the instruction may cause playback device 220 to automatically navigate to the home screen. Additionally, or alternatively, the instruction may cause playback device 220 to provide an interaction indicator that highlights to the user how the user may navigate to the other screen that includes the particular icon and/or highlight to the user where the particular icon is located on the other screen, or the like.

In some implementations, playback device 220 may display the content using a portion of a display associated with playback device 220 (e.g., using a half of a display or using a quarter of a display). In this way, a user of playback device 220 may view the content and/or simultaneously interact with a screen associated with playback device 220.

As further shown in FIG. 5, process 500 may include detecting a user interaction with the playback device in association with the content (block 530), and navigating to a particular screen associated with playback device 220 (block 540). For example, playback device 220 may detect a user interaction (e.g., a touch gesture) with playback device 220 in association with the content, and may navigate to a particular screen associated with playback device 220 based on detecting the user interaction.

In some implementations, playback device 220 may detect a user interaction, such as a touch gesture, a click, or the like, with a link and/or shortcut associated with the content and may navigate to a particular screen based on detecting the user interaction. For example, assume that the content includes screen information associated with a sequence of screens (e.g., includes a tutorial on how to configure a setting or use an application). Playback device 220 may navigate to a first screen associated with the sequence of screens based on detecting the user interaction with the link. Additionally, or alternatively, playback device 220 may navigate to another screen associated with the sequence of screens (e.g., a last screen).

In some implementations, playback device 220 may display content that includes different screen information based on detecting a user interaction with playback device 220. For example, assume that the content includes screen information associated with multiple screens. Playback device 220 may display content that includes screen information associated with a particular screen, may detect a user interaction, and may display content that includes screen information associated with a different screen based on detecting the user interaction. Additionally, or alternatively, playback device 220 may provide a pause between displaying content that includes screen information associated with different screens and/or may provide a pause in displaying the content based on detecting a user interaction with playback device 220.

Additionally, or alternatively, playback device 220 may display content that includes different indications of user interactions based on detecting a user interaction with playback device 220. For example, assume that the content includes multiple indications of user interactions (e.g., one or more interaction indicators). Playback device 220 may display a particular interaction indicator, may detect a user interaction with playback device 220, and may display another interaction indicator based on detecting the user interaction with playback device 220. Additionally, or alternatively, playback device 220 may pause play back while displaying a particular interaction indicator, and may display a subsequent interaction indicator based on detecting a user interaction.

In some implementations, playback device 220 may provide one or more playback controls (e.g., pause, fast-forward, and/or rewind), and may perform an action associated with a playback control based on a user interaction. For example, a user of playback device 220 may interact with playback device 220 to adjust a playback rate of the content (e.g., normal speed, half speed, or the like). Additionally, or alternatively, playback device 220 may display the content at a particular rate, and may provide audio associated with the content at the particular rate or another rate (e.g., normal speed). In this way, a user may control playback of the content based on interacting with playback device 220.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein may assist a user device in generating content that includes screen information and an indication of one or more user interactions. In this way, a user may provide content to another user, which may allow the other user to reduce a quantity of operating errors when using a user device, thereby conserving processor and/or memory resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, and/or a position of information provided via the user interface). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    a touch screen display;
    a memory; and
    one or more processors, during communication session between the device, associated with a user, and another device, associated with another user, to:
        activate a screen capture mode;
        record screen information provided via the touch screen display associated with the device based on activating the screen capture mode;
        detect one or more user interactions, associated with the user, with the touch screen display in association with the screen information,
            the one or more user interactions including a touch gesture;
        deactivate the screen capture mode;
        generate content including the screen information and an indication of the one or more user interactions,
            the indication of the one or more user interactions being overlaid on the screen information, and
            the indication of the one or more user interactions to be displayed for a duration that corresponds to a duration of the one or more user interactions when the content is played;
        configure, based on receiving configuration information from the user, the generated content to create configured content,
            the configured content being different than the generated content and including one or more changes to the generated content that are based on the configuration information; and
        transmit the configured content to the other device.

2. The device of claim 1, where the one or more processors are further to:
    embed a link, within the configured content, that when accessed by the other device causes the other device to navigate to a particular screen associated with the other device.

3. The device of claim 1, where the one or more processors are further to:
    provide the configured content to a server device; and
    receive a uniform resource identifier based on providing the configured content to the server device,
        the uniform resource identifier being associated with the configured content.

4. The device of claim 1, where the one or more processors, when detecting the one or more user interactions, are to:
    determine a position associated with the touch gesture in relation to the screen information,
        the position being associated with a portion of the touch screen display; and generate the indication based on the position,
            the indication being overlaid on the screen information to indicate the position.

5. The device of claim 1, where the one or more processors are further to:
    configure the generated content to permit the other user, of the other device, to control playback of the content at the other device.

6. The device of claim 1, where the one or more processors are further to:
associate device information with the content,
the device information being used to determine whether the content is relevant to device information for another device, and
where the one or more processors, when generating the content, are to:
generate the content based on associating the device information with the content.

7. The device of claim 1, where the generated content includes a plurality of screen views and the configured content introduces a pause before a transition from a first screen view, of the plurality of screen views, to a second screen view of the plurality of screen views.

8. A non-transitory computer-readable medium storing instructions, the instructions comprising:
one or more instructions that, when executed by one or more processors of a device and during a communication session between the device, associated with a user, and another device, associated with another user, cause the one or more processors to:
activate a screen capture mode;
record screen information associated with multiple screens, provided via a touch screen display of the device, based on activating the screen capture mode;
detect one or more user interactions, associated with the user, with the touch screen display in association with the screen information,
the one or more user interactions including a touch gesture;
deactivate the screen capture mode;
generate content that includes the screen information and an indication of the one or more user interactions,
the indication of the one or more user interactions being overlaid on the screen information,
the indication of the one or more user interactions being displayed for a duration that corresponds to a duration of the one or more user interactions,
the content being usable by another device to recreate the screen information and the one or more user interactions;
configure, based on receiving configuration information from the user, the generated content to create configured content,
the configured content being different than the generated content and including one or more changes to the generated content that are based on the configuration information; and
transmit the configured content to the other device.

9. The non-transitory computer-readable medium of claim 8, where the touch gesture includes at least one of:
a tap,
a double-tap,
a tap and hold,
a nudge,
a pinch,
a spread,
a slide,
a drag,
a flick, or
a swipe.

10. The non-transitory computer-readable medium of claim 8, where the one or more user interactions includes an audible user interaction.

11. The non-transitory computer-readable medium of claim 8, where the one or more instructions, when executed by the one or more processors, further cause the one or more processors to:
provide the configured content to a server device;
receive a uniform resource identifier based on providing the configured content to the server device,
the uniform resource identifier providing access to the configured content; and
provide the uniform resource identifier to another device.

12. The non-transitory computer-readable medium of claim 8, where the one or more instructions, that cause the one or more processors to activate the screen capture mode, cause the one or more processors to:
activate the screen capture mode based on the user navigating to a particular screen of the device.

13. The non-transitory computer-readable medium of claim 8, where the one or more instructions, when executed by the one or more processors, further cause the one or more processors to:
configure the generated content to permit the other user to control playback of the content at the other device.

14. The non-transitory computer-readable medium of claim 8, where the generated content includes a plurality of screen views and the configured content introduces a pause before a transition from a first screen view, of the plurality of screen views, to a second screen view of the plurality of screen views.

15. A method, comprising:
accessing, by a device, content based on requesting the content using a uniform resource identifier during a communication session between the device, associated with a user, and another device, associated with another user,
the content including screen information and an indication of one or more user interactions,
the screen information being recorded by the other device during the communication session based on information provided for display on the other device,
the one or more user interactions including a touch gesture recorded by the other device in association with the screen information;
displaying, by the device, the content based on accessing the content,
the indication of the one or more user interactions being overlaid on the screen information in the content, and
the indication of the one or more user interactions being displayed for a duration that corresponds to a duration of the one or more user interactions;
detecting, by the device, a device-user interaction with the content; and
navigating, by the device, to a particular screen associated with the device based on detecting the device-user interaction with the content.

16. The method of claim 15, where the content includes first screen information, associated with a first screen of the other device, and second screen information associated with a second screen of the other device; and
where displaying the content includes providing a pause between displaying the first screen information and the second screen information.

17. The method of claim 15, where detecting the device-user interaction comprises:
detecting the device-user interaction in association with a link; and where navigating to the particular screen comprises:

navigating to the particular screen based on detecting the device-user interaction in association with the link.

18. The method of claim 15, where the indication of the one or more user interactions includes an indication of an audible user interaction.

19. The method of claim 15, where the device receives the content based on a message received from the other device.

20. The method of claim 15, further comprising:
pausing the content based on detecting the device-user interaction; and
resuming the content based on navigating to the particular screen.

* * * * *